(12) United States Patent
Du et al.

(10) Patent No.: US 11,865,893 B2
(45) Date of Patent: Jan. 9, 2024

(54) SUPPORT DEVICE FOR SPRING AND VEHICLE HAVING THE SAME

(71) Applicant: SHANGHAI LINGHUO TRADING CO., LTD., Shanghai (CN)

(72) Inventors: Dehui Du, Shanghai (CN); Jia Fu, Shanghai (CN)

(73) Assignee: SHANGHAI LINGHUO TRADING CO., LTD., Shanghai (CN)

( * ) Notice: Subject to any disclaimer, the term of this patent is extended or adjusted under 35 U.S.C. 154(b) by 0 days.

(21) Appl. No.: 18/114,252

(22) Filed: Feb. 25, 2023

(65) Prior Publication Data

US 2023/0382173 A1 Nov. 30, 2023

(30) Foreign Application Priority Data

May 24, 2022 (CN) .......................... 202221377346.X

(51) Int. Cl.
B60G 9/02 (2006.01)
(52) U.S. Cl.
CPC ............ B60G 9/02 (2013.01); *B60G 2206/31* (2013.01)
(58) Field of Classification Search
CPC ............................... B60G 9/02; B60G 2206/31
USPC .......................................... 280/86.75, 86.752
See application file for complete search history.

(56) References Cited

U.S. PATENT DOCUMENTS

| | | | | |
|---|---|---|---|---|
| 4,171,830 A * | 10/1979 | Metz | ..................... | B62D 61/125 280/86.5 |
| 4,817,984 A * | 4/1989 | Ferman | ................. | B60G 15/068 280/86.752 |
| 5,549,319 A * | 8/1996 | Kring | ..................... | B62D 17/00 403/4 |
| 6,224,074 B1 * | 5/2001 | Cadden | ..................... | B60G 9/02 280/678 |
| 6,302,416 B1 * | 10/2001 | Schmack | ............... | B60G 15/07 280/86.754 |
| 6,382,645 B1 * | 5/2002 | Gravelle | .............. | B60G 15/068 280/86.752 |
| 7,665,743 B2 * | 2/2010 | Poncher | ............... | B60G 17/021 280/124.147 |
| 8,317,210 B1 * | 11/2012 | Ryshavy | .............. | B60G 15/067 280/124.147 |
| 8,403,346 B2 * | 3/2013 | Chalin | ..................... | B60G 9/00 280/5.514 |
| 9,150,247 B2 * | 10/2015 | Aldrich | ..................... | B60G 9/00 |
| 10,427,483 B1 * | 10/2019 | Aldrich | ..................... | B60G 9/00 |
| 10,471,793 B2 * | 11/2019 | Kueppers | ............. | B60G 21/051 |

(Continued)

FOREIGN PATENT DOCUMENTS

| | | |
|---|---|---|
| DE | 19818698 A1 | 6/1999 |
| DE | 202017107581 U1 | 4/2018 |
| KR | 10-2006-0002423 A | 1/2006 |

*Primary Examiner* — Toan C To
(74) *Attorney, Agent, or Firm* — Cheng-Ju Chiang

(57) ABSTRACT

The present document provides a support device for spring and a vehicle having the same. The support device for spring includes a first support unit configured for being fixed to a vehicle body; a second support unit configured for supporting a damper spring; and a connection unit configured for detachably fixing the second support unit to different circumferential positions of the first support unit. If the second support unit is fixed to different circumferential positions of the first support unit, a spring support surface of the second support unit faces different directions.

20 Claims, 9 Drawing Sheets

(56) References Cited

U.S. PATENT DOCUMENTS

| | | | |
|---|---|---|---|
| 2006/0131799 A1* | 6/2006 | Carlitz | B60G 17/021 |
| | | | 267/195 |
| 2009/0224503 A1* | 9/2009 | Richardson | B60B 35/08 |
| | | | 29/897.2 |
| 2017/0015174 A1* | 1/2017 | Ruppert | B60G 17/0525 |

* cited by examiner

SUPPORT DEVICE FOR SPRING AND VEHICLE HAVING THE SAME

CROSS REFERENCE TO RELATED APPLICATION

The present document claims the benefit of priority of Chinese patent application number 202221377346.X, filed on May 24, 2022, and entitled "A NEW TYPE OF SUPPORT DEVICE FOR SPRING FOR AUTOMOBILE CHASSIS AND VEHICLE HAVING THE SAME". The entire disclosure of the above-identified application is incorporated herein by reference.

TECHNICAL FIELD

The present document relates to automobile structures, in particular to a support device for spring and a vehicle having the same.

BACKGROUND

Since the launch of the first off-road vehicle model, the appearance, interior trim, four-wheel drive technology, and power system of the off-road vehicle have made great progress, however, as the core of the chassis, the integral front axle assembly has not been substantially improved.

SUMMARY

The present document discloses, among other things, a support device for spring and a vehicle having the same. On the basis of better support for the damper spring, the support device for spring can be used to adjust an orientation angle of a spring support surface according to requirement, such that the vehicle can be conveniently fine-tuned without damage to the vehicle.

The support device for spring, includes: a first support unit configured for being fixed to a vehicle body; a second support unit configured for supporting a damper spring; and a connection unit configured for detachably fixing the second support unit to different positions of the first support unit. If the second support unit is fixed to different positions of the first support unit, a spring support surface of the second support unit faces different directions.

In some embodiments, one of adjacent two units of the first support unit, the second support unit and the connection unit is provided with a first angle adjustment structure, the other one of the adjacent two units of the first support unit, the second support unit and the connection unit is provided with a second angle adjustment structure, the first angle adjustment structure has different circumferential positions relative to the second angle adjustment structure.

In some embodiments, one of the first angle adjustment structure and the second angle adjustment structure is provided with a plurality of protrusions, the other one of the first angle adjustment structure and the second angle adjustment structure is provided with a plurality of depressions, the protrusions each is capable of engaging with several different depressions, making the second angle adjustment structure have different installation angles relative to the first angle adjustment structure.

In some embodiments, the first support unit has an arc-shaped first contact surface, the second support unit has an arc-shaped second contact surface which is capable of contacting with different positions of the first contact surface, the first angle adjustment structure is provided on the first contact surface, and the second angle adjustment structure is provided on the second contact surface.

In some embodiments, the first support unit has an elongate hole extending along a circumferential direction of the first contact surface, the second support unit has a connection hole defined therethrough, the connection unit includes a first connection member capable of extending through the connection hole and the elongate hole, for fixing the second support unit to the first support unit.

In some embodiments, the first support unit includes a first support substrate and two first sidewalls disposed at opposite sides of the first support substrate, the second support unit includes a second support substrate and two second sidewalls disposed at opposite side of the second support substrate, the second support unit is capable of covering the first support unit, the first contact surface and the second contact surface are provided between the first support substrate and the second support substrate.

In some embodiments, the second support unit has an arc-shaped third contact surface, the connection unit has an arc-shaped fourth contact surface which is capable of contacting with the third contact surface, the first angle adjustment structure is provided on the third contact surface, and the second angle adjustment structure is provided on the fourth contact surface.

In some embodiments, the first support unit includes a first support body and a first connection base, both of which are fixed to the vehicle body, the second support unit includes a second support body which is capable of covering the first support body, and a second connection base which is connected with the second support body, the connection unit includes a cover plate which is capable of covering the second connection base, and a second connection member which is capable of cooperating with the first connection base to sandwich the second connection base between the first connection base and the cover plate, the third contact surface is formed on the second connection base, the fourth contact surface is formed on the cover plate.

In some embodiments, the first support body has a first contact surface and an elongate hole extending through the first support body, the second support body has a second contact surface capable of contacting with the first contact surface and a connection hole extending through the second support body, the connection unit includes a first connection member which is capable of extending through the connection hole and the elongate hole, to fix the second support body to the first support body.

In some embodiments, the support device for spring, includes: a first support unit configured for being fixed to a vehicle body; a second support unit configured for supporting a damper spring; and a connection unit includes a first connection apparatus which is capable of cooperating with the first support unit to sandwich the second support unit therebetween. One of adjacent units of the first support unit, the second support unit and the connection unit includes a first angle adjustment structure, the other one of adjacent units of the first support unit, the second support unit and the connection unit includes a second angle adjustment structure. The second angle adjustment structure is capable of cooperating with different positions of the first angle adjustment structure, such that the second support unit is capable of having different installation angles relative to the first support unit.

In some embodiments, the first support unit comprises a first support body, an arc-shaped first contact surface and an elongate hole, the second support unit comprises a second support body, an arc-shaped second contact surface and a connection hole, the first contact surface and the second contact surface is formed between the first support body and the second support body, the elongate hole extends along a circumferential direction of the first contact surface, the connection hole extends through the second support body, the first connection apparatus comprises a first connection member capable of extending through the connection hole and the elongate hole, for fixing the second support unit to the first support unit.

In some embodiments, the first support body includes a first support substrate and two first sidewalls disposed at opposite sides of the first support substrate, the second support body includes a second support substrate and two second sidewalls disposed at opposite side of the second support substrate, the second support unit is capable of covering the first support unit, the first contact surface and the second contact surface are provided between the first support substrate and the second support substrate.

In some embodiments, the first angle adjustment structure and the second angle adjustment structure are provided on the first contact surface and the second contact surface respectively, one of the first angle adjustment structure and the second angle adjustment structure is provided with a plurality of protrusions, the other one of the first angle adjustment structure and the second angle adjustment structure is provided with a plurality of depressions, the protrusions each is capable of engaging with several different depressions.

In some embodiments, the second support unit includes an arc-shaped third contact surface, the connection unit includes a cover plate capable of being covering the third contact surface, and the cover plate includes an arc-shaped fourth contact surface, the first angle adjustment structure and the second angle adjustment are provided on the third contact surface and the fourth contact surface respectively, with a longitudinal length of the second angle adjustment structure being greater than a longitudinal length of the first angle adjustment structure, one of the first angle adjustment structure and the second angle adjustment structure is provided with a plurality of protrusions, the other one of the first angle adjustment structure and the second angle adjustment structure is provided with a plurality of depressions, the protrusions each is capable of engaging with several different depressions.

In some embodiments, the first support unit includes a first connection base being fixed to the vehicle body, the second support unit includes a second connection base being connected with the second support body, the connection unit includes a second connection member capable of cooperating with the first connection base to sandwich the second connection base between the first connection base and the cover plate.

The present document also discloses a vehicle, which includes a damper spring and a support device for supporting the damper spring. The support device includes a first support unit configured for being fixed to a vehicle body; a second support unit configured for supporting a damper spring; and a connection unit includes a first connection apparatus which is capable of cooperating with the first support unit to sandwich the second support unit therebetween. One of adjacent units of the first support unit, the second support unit and the connection unit includes a first angle adjustment structure, the other one of adjacent units of the first support unit, the second support unit and the connection unit includes a second angle adjustment structure. One of the first angle adjustment structure and the second angle adjustment structure is provided with a plurality of protrusions, the other one of the first angle adjustment structure and the second angle adjustment structure is provided with a plurality of depressions, the protrusions each is capable of engaging with several different depressions.

In some embodiments, the second support unit includes a first contact surface, the first connection apparatus includes a cover plate and a first connection member, the cover plate includes a second contact surface, the first angle adjustment structure and the second angle adjustment structure are provided on the first contact surface and the second contact surface respectively, the first connection member is capable of cooperating with the first support unit to sandwich the second connection base between the first connection base and the cover plate.

In some embodiments, the first support unit includes a first support body and a first connection base, both of which are fixed to the vehicle body, the second support unit includes a second support body which is capable of having different circumferential cooperation positions on the first support body, and a second connection base which is connected with the second support body, the first connection member is capable of cooperating with the first connection base to sandwich the second connection base between the first connection base and the cover plate.

In some embodiments, the first support body includes a first support substrate and two first sidewalls disposed at opposite sides of the first support substrate, the second support body includes a second support substrate and two second sidewalls disposed at opposite sides of the second support substrate, an arc-shaped third contact surface and an arc-shaped fourth contact surface are respectively formed on the first support substrate and the second support substrate, the connection unit includes a second connection apparatus which includes a second connection member capable of extending through the second support body and the first support body to fix the second support body on the first support body.

In some embodiments, the first support unit includes a first support body, a first contact surface formed on the first support body, and an elongate hole extending through the first support body; the second support unit includes a second support body capable of covering the first support body, a second contact surface capable of having different relative angles to the first contact surface, and a connection hole extending though the second support body, the first connection apparatus includes a first connection member which is capable of extending through the connection hole and the elongate hole, to fix the second support body to the first support body.

In some embodiments, if the second support unit is arranged on the first support unit, the protrusions each can extend into several different depressions. By the arrangement of the first angle adjustment structure and the second angle adjustment structure between the second support unit and the connection unit, the second support unit may be fixed to different circumferential positions of the first support unit, and have different installation angles relative to the first support unit. Since the contact surfaces are arc-shaped, when the protrusion engages in different depressions, a spring support surface of the second support unit will face to different directions. Through the above arrangement, if the installation angle of the damper spring needs to be adjusted after the vehicle chassis is lifted, it can be adjusted by changing the relative circumferential position of the second support unit to the first support unit, which makes the second support unit may have different orientations, such that the installation angle of the damper spring can be adjusted. Therefore, on the basis of better support the damper spring, the orientation angle of the second support unit can be adjusted as required, which facilitates to fine-tune the vehicle without damage.

DETAILED DESCRIPTION OF PREFERRED EMBODIMENTS

Figure 1:
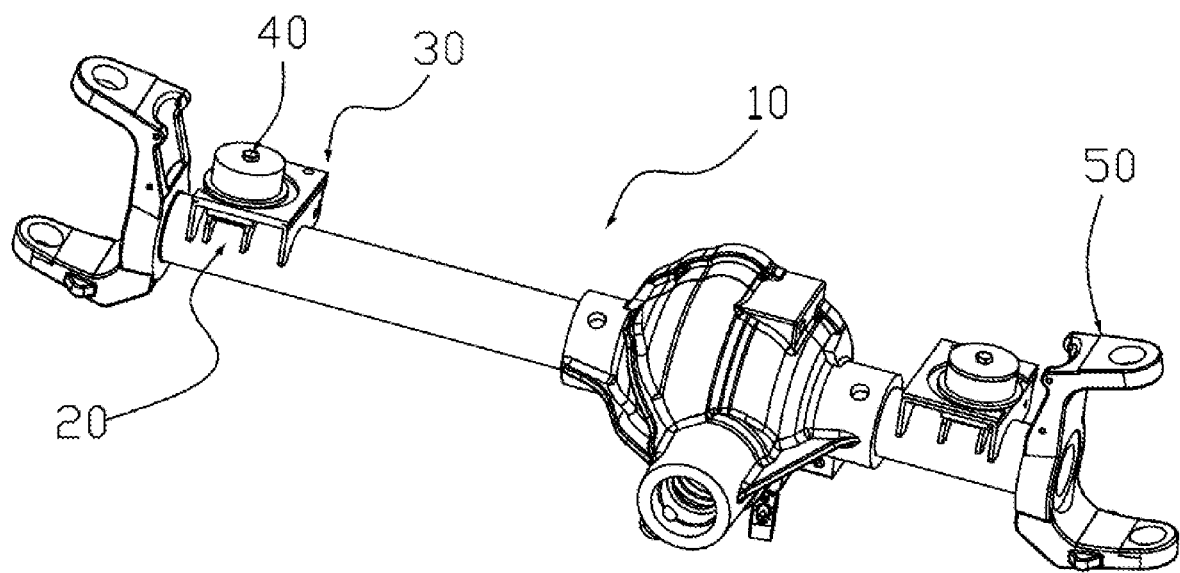
FIG. 1 is a schematic, isometric view showing a first example of a support device for spring being mounted to peripheral components thereof.

In order to make the purpose, the technical solutions and the advantages of the present document, various embodiments will be further described in detail.

It should be noted that in the description, terms such as "first" and "second" are used to distinguish similar objects, and are not necessarily used to describe a specific order or sequence. It is to be understood that the data so used are interchangeable under appropriate circumstances such that the embodiments described herein can be practiced in sequences other than those illustrated or described herein.

In the present document, the orientation or positional relationship indicated by the terms "upper", "lower", "top", "bottom", etc. are based on the orientation or positional relationship shown in the drawings, and are only for the convenience of describing and for simplifying the description, rather than indicating or implying that the device or element must have a specific orientation, be constructed and operate in a specific orientation, and thus should not be construed as limitation of the disclosure. The X direction refers to the length direction of a vehicle, the Y direction refers to the width direction of the vehicle, and the Z direction refers to the height direction of the vehicle.

In addition, unless be clearly specified and limited, terms such as "install", "connect", "link" and "fix" in the present document should be interpreted in a broad sense. For example, the term may be used to describe a fixed connection or a detachable connection, or an integration into a single piece; directly connected, or indirectly connected through an intermediary, and may be an internal communication between two elements or an interaction relationship between two elements, unless otherwise clearly defined. For those of ordinary skill in the art the specific meanings of the above terms in the present document can be understood according to specific situations.

BRIEF INTRODUCTION

In the past 25 years, the global sales of off-road vehicles have exceeded 30 million, and consumers' demand for customization and modification of such models is also increasing day by day. For global automakers and modification shops, changing to bigger tires, replacing or enhancing the suspension system to lift the vehicle chassis for more ground clearance, and making the overall appearance of the vehicle more attractive have become the most common ways of customization in the industry. The damper spring is one of the important components of the vehicle. When the vehicle chassis is lifted, an installation angle of the damper spring will be changed as well, in order to adapt to the vehicle chassis of different heights.

During modification of the vehicles, it is required to frequently weld a support device in different orientations of an axle tube, and then install the damper spring on the support device to fine-tune the vehicle. This method is cumbersome and frequent welding, cutting and removing the support device for spring will cause damage to the axle tube.

EMBODIMENTS

In one example aspect, the present document provides a support device for spring and a vehicle having the same. On the basis of better support for the damper spring, the support device for spring can adjust an orientation angle of a spring support surface as required, which makes the vehicle can be conveniently fine-tuned without damage to the vehicle.

First Embodiment

Referring to FIG. 1 to FIG. 7, the support device for spring includes a first support unit 20, a second support unit 30 and a connection unit 40. The first support unit 20 is capable of being fixed to a vehicle body, such as an axle tube 10 of a vehicle. The second support unit 30 is for supporting a damper spring. The connection unit 40 is capable of detachably fixing the second support unit 30 to the first support unit 20.

The first support unit 20 is provided with a first angle adjustment structure 21, and the second support unit 30 is provided with a second angle adjustment structure 31. One of the first angle adjustment structure 21 and the second angle adjustment structure 31 is provided with a plurality of protrusions, the other one of the first angle adjustment structure 21 and the second angle adjustment structure 31 is provided with a plurality of depressions. In some embodiments, the first angle adjustment structure 21 and the second angle adjustment structure 31 are both provided with a plurality of gear teeth or a plurality of splines. This means the protrusions are the gear teeth or the splines, the depressions are formed between adjacent gear teeth or adjacent splines. The protrusions or the depressions are disposed along an arc surface of the first support unit 20 or along an arc surface of the second support unit 30. The protrusions each is capable of engaging with different depressions, such that the second support unit 30 may be mounted to different circumferential portions of the first support unit 20, and may have different installation angles relative to the first support unit 20, which makes the damper spring on the second support unit 30 may have different relative angles to the vehicle body. Accordingly, an orientation angle of a spring support surface of the second support unit 30 can be adjusted as required, and further makes the vehicle can be conveniently fine-tuned without damage to the vehicle.

Figure 3:
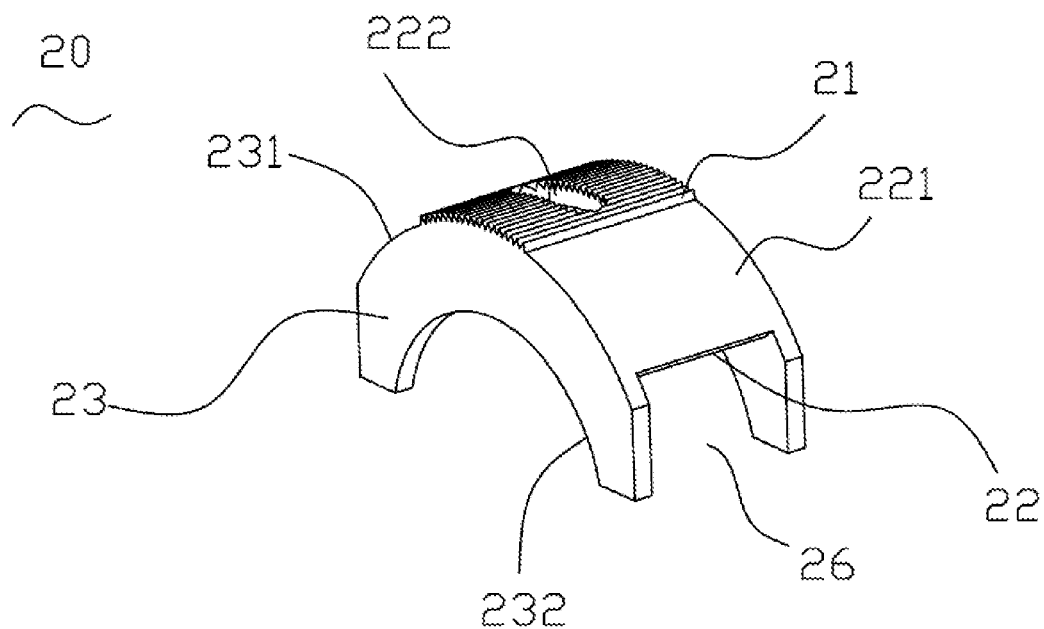
FIG. 3 is a schematic, isometric view of a first support unit in FIG. 1.
Figure 4:
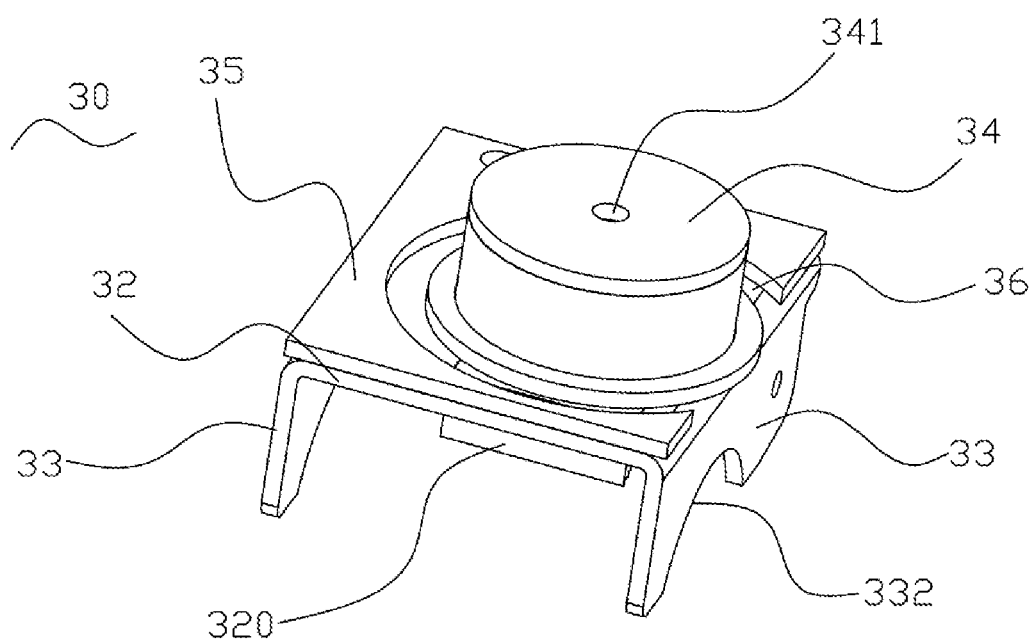
FIG. 4 is a schematic, isometric view of a second support unit in FIG. 1.
Figure 5:
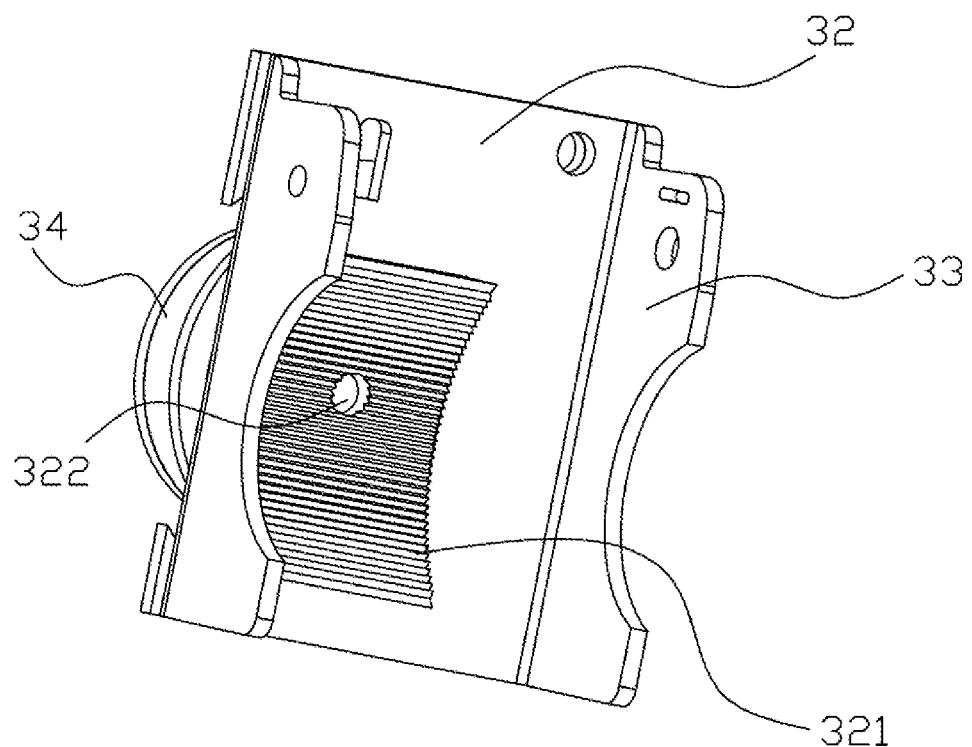
FIG. 5 is another schematic, isometric view of the second support unit in FIG. 1.
Figure 6:
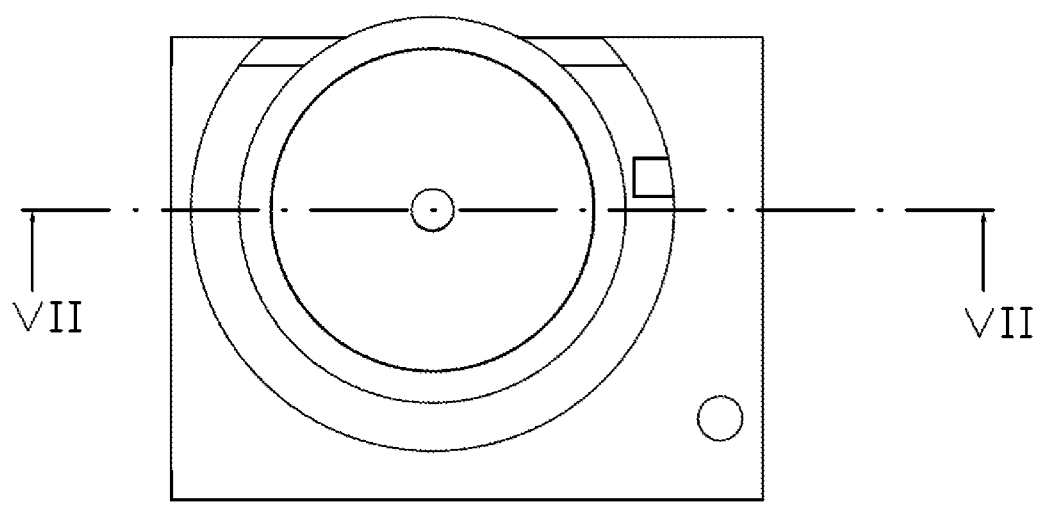
FIG. 6 is a schematic, top view of the second support unit in FIG. 1.
Figure 7:
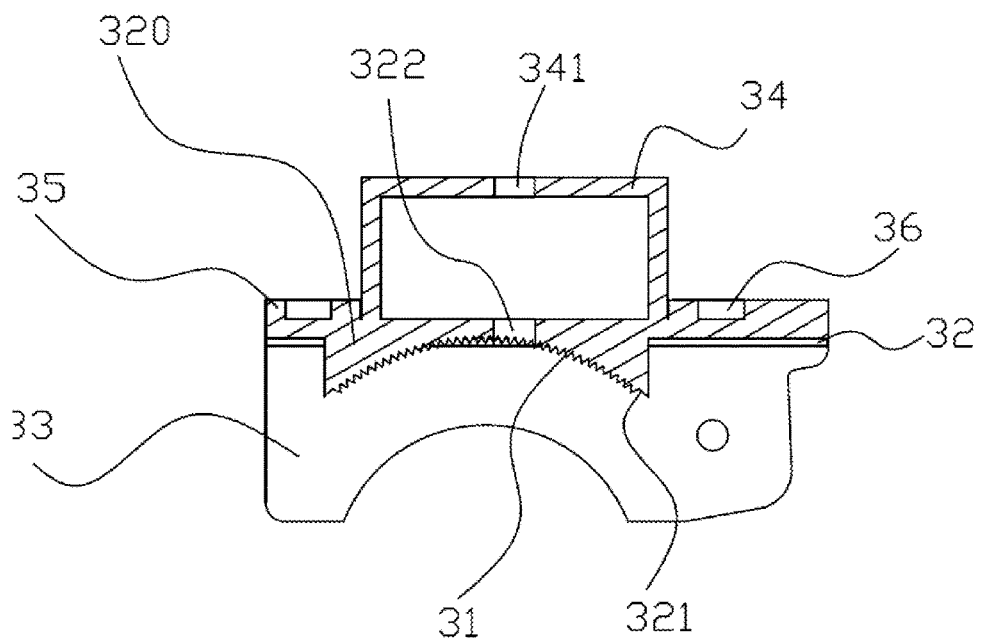
FIG. 7 is a schematic, cross-sectional view taken along line VII-VII of FIG. 6.
Figure 8:
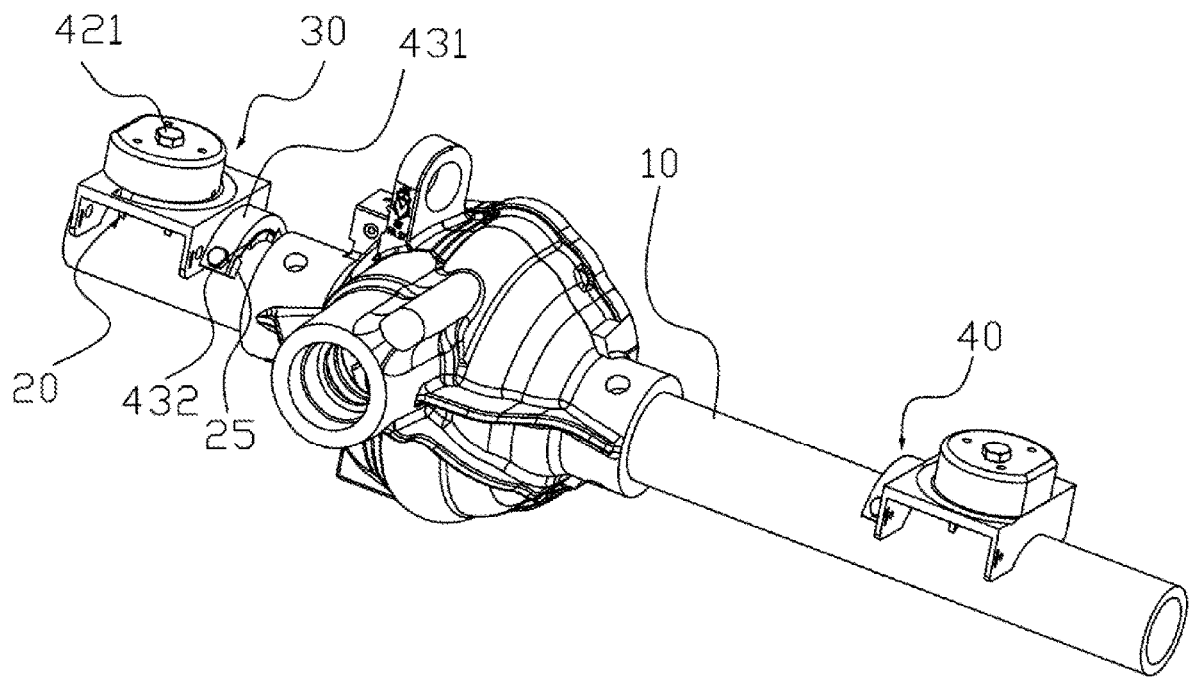
FIG. 8 is a schematic, isometric view showing a second example of a support device for spring being mounted to peripheral components thereof.

Referring to FIG. 3, the first support unit 20 includes a first support body which includes a first support substrate 22 and two first sidewalls 23. The first sidewalls 23 are arranged at opposite left and right sides of the first support substrate 22.

Viewed from the left or right side of the first support unit 20 (i.e., viewed from Y direction of the vehicle), the first support substrate 22 is arc-shaped and the first sidewalls 23 are substantially sector-shaped. The first support substrate 22 has an arc-shaped first contact surface 221 on an upper side which faces the second support unit 30. The first contact surface 221 is a convex surface with a central portion thereof protruding toward the second support unit 30. The first angle adjustment structure 21 is provided on the first contact surface 221 and the protrusions or the depressions are arranged along a circumferential direction of the first contact surface 221. The first support substrate 22 includes an elongate hole 222 which extends along the circumferential direction of the first contact surface 221, for allowing at least a portion of the connection unit 40 passing through.

The first sidewall 23 has a first arc surface 231 and a second arc surface 232. The first arc surface 231 is disposed at an outer portion of the first sidewall 23 and coplanar with the first contact surface 221. The second arc surface 232 is disposed at an inner portion of the first sidewall 23 and parallel to the first arc surface 231. That is, the second arc surface 232 is coaxial with the first arc surface 231. In some embodiments, the second arc surface 232 is coplanar with an outer circumferential surface of the axle tube 10, resulting the first sidewall 23 of the first support unit 20 can perfectly match with the outer circumferential surface of the axle tube 10, such that the first support unit 20 can be firmly bonded or welded to the axle tube 10 into a single piece.

Referring to FIG. 4 to FIG. 7, the second support unit 30 includes a second support body which includes a second support substrate 32 and two second sidewalls 33, and a spring support 34. The second sidewalls 33 extend downwardly from opposite left and right sides of the second support substrate 32. The spring support 34 is arranged on an upper side of the second support substrate 32 which is remote from the first support unit 20.

The second support substrate 32 is substantially rectangular shaped, and has a projection 320 downwardly extending from a lower side thereof. The projection 320 has an arc-shaped second contact surface 321 on a lower side which faces the first support substrate 22. The second contact surface 321 is a convex surface with a central portion thereof protruding toward the spring support 30. The second angle adjustment structure 31 is provided on the second contact surface 321 and the protrusions or the depressions are arranged along a circumferential direction of the second contact surface 321.

The second sidewall 33 is substantially rectangular shaped, and has a third arc surface 332 on a lower portion thereof. The third arc surface 332 is parallel to the second contact surface 321 and coplanar with the outer circumferential surface of the axle tube 10, which makes the second sidewall 33 of the second support unit 30 can perfectly match with the outer circumferential surface of the axle tube 10, such that the second support unit 30 can slide around the axle tube 10 and may have multiple installation angles relative to the axle tube 10 and the first support unit 20. When the second support unit 30 is placed on the first support unit 20, the first support unit 20 is located between the two second sidewalls 33. A height of the second sidewall 33 is set in a manner that when the second support unit 30 is connected to the first support unit 20, the third arc surface 332 of the second sidewall 33 abuts against the vehicle body, such as the axle tube 10 of the vehicle, in order to optimize a force exerted on the second support unit 30.

The spring support 34 is substantially column shaped, which is fixed to the second support substrate 32, for support the damper spring. The spring support 34 is provided with a first connection hole 341, and the second support substrate 32 is provided with a second connection hole 322. The first connection hole 341 aligns with the second connection hole 322, for allowing the connection unit 40 passing through. In this embodiment, the first connection hole 341 and the second connection hole 322 are round holes.

In some embodiments, the second support unit 30 includes a pad 35, which is arranged at an upper side of the second support substrate 32. A C-shaped recess for receiving the spring support 34 is defined in the pad 35. If the pad 35 is disposed on the second support substrate 32, an accommodation space 36 is formed between a side wall of the recess and a side wall of the spring support 34 to accommodate a bottom end of the damper spring. Alternatively, in some embodiments, there may be no pad 35, and the recess is defined in the second support substrate 32. The accommodation space 36 may be formed between at an upper portion of the s second support substrate 32.

Figure 2:
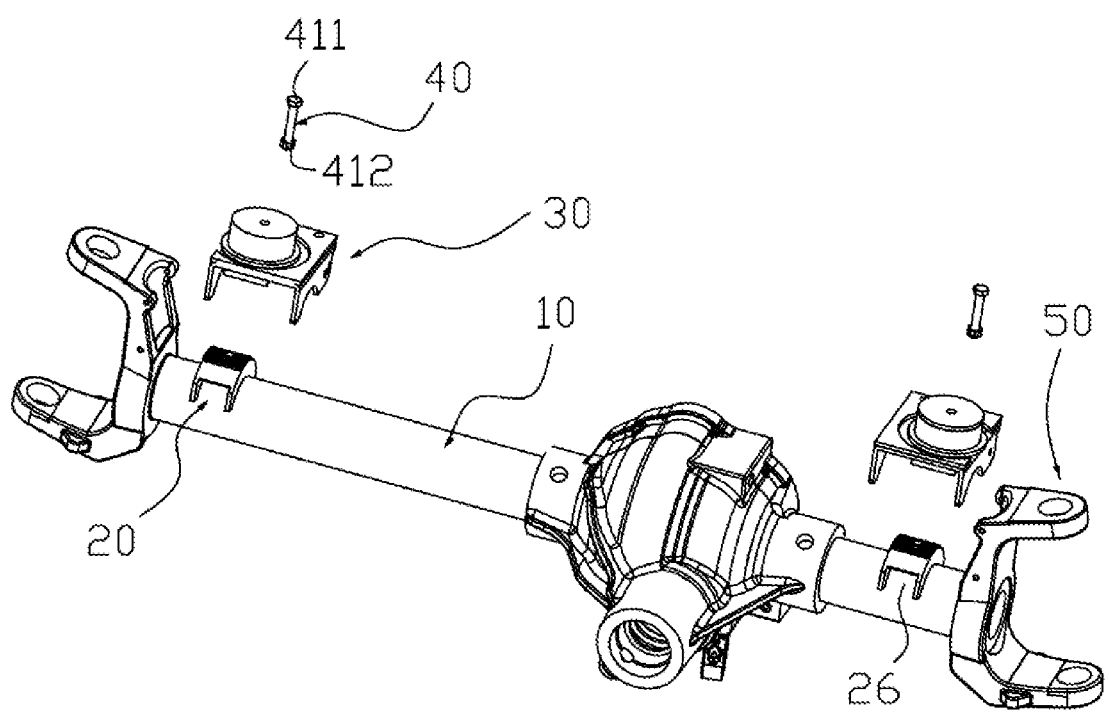
FIG. 2 is a schematic, exploded view of FIG. 1.

Referring to FIG. 2, the connection unit 40 may include a first connection apparatus which includes a first connection member 421 and a fixation member 422. The first connection member 421 may be a screw bolt, a rivet or a pin which may insert through the first support unit 20 and the second support unit 30. The fixation member 422 may be a screw nut which is capable of cooperating with the screw bolt, or a plug which is capable of being radially inserted into a hole of the rivet. In this embodiment, the first connection member 421 is a screw bolt and the fixation member 422 is a screw nut. During assembly, the first connection member 421 is inserted through the first connection hole 341, the second connection hole 322 and the elongate hole 222, and cooperates with the fixation member 422, so as to fix the second support unit 30 on the first support unit 20. Due to the arrangement of the elongate hole 222, the first connection member 421 can locate at different longitudinal positions of the elongate hole 222, such that the second support unit 30 can have different installation angles relative to the first support unit 20. When the first support unit 20 is bonded or welded on the vehicle body, an operation space 26 is formed between the first sidewall 23, the first support substrate 22 and the vehicle body, which is convenient for screwing the fixation member 422 to the first connection member 421.

In some embodiments, if the second support unit 30 is placed on the first support unit 20, the protrusions each can extend into several different depressions. By the arrangement of the first angle adjustment structure 21 and the second angle adjustment structure 31 between the first support unit 20 and the second support unit 30, the second support unit 30 may be fixed to different circumferential positions of the first support unit 20, and have different installation angles relative to the first support unit 20. Since the first contact surface 221 and the second contact surface 321 are arc-shaped, when the protrusion engages in different depressions, a spring support surface of the second support unit 30, i.e., a top surface of the second support substrate 32 or the pad 35, will face to different directions. Through the above arrangement, if the installation angle of the damper spring needs to be adjusted after the vehicle chassis is lifted, it can be adjusted by changing the relative circumferential position of the second support unit 30 to the first support unit 20, which makes the second support unit 30 may have different orientations, such that the installation angle of the damper spring can be adjusted. Therefore, on the basis of better support the damper spring, the orientation angle of the second support unit 30 can be adjusted as required, which facilitates to fine-tune the vehicle without damage.

In some embodiments, when the support device for spring is installed on the vehicle, the centers of the circles which the first contact surface 221 and the second contact surface 321 locate are both located at a side close to the ground, that is, they are both remote from the spring support surface of the second support unit 30. When the support device for spring is installed above the axle tube 10, the centers of the arc surfaces is located on a side where the axis of the axle tube 10 is located. If the protrusion engages in different depressions, a central axis of the second contact surface 321 forms different angles with a central axis of the first contact surface 221, making the second support unit 30 have different installation angles relative to the first support unit 20. It should be noted that, the central axes of the contact surfaces are the central axes of the arc surfaces as viewed from the left or the right side of the contact surfaces. That is, when the support device for spring is mounted on the vehicle, the central axes of the contact surfaces are the central axes of the arc surfaces when viewed in Y direction of the vehicle.

Some embodiments may include a vehicle. Referring to FIG. 1 and FIG. 2, the vehicle includes the support device for spring, a damper spring and a steering knuckle 50. The damper spring is connected to a first portion of the vehicle body, such as the vehicle chassis. The support device for spring is used to connect a second portion of the vehicle body (such as the axle tube) and the damper spring, and its structure is described as forgoing. The steering knuckle 50 is located at one side of the support device for spring, for connecting with a kingpin. In some embodiments, the steering knuckle 50 may be an inner-C-forgoing. The first support unit 20 of the support device for spring is fixed on the axle tube 10, and the connection unit 40 is capable of detachably fixing the second support unit 30 on the first support unit 20 with different installation angles. If the second support unit 30 is fixed on the first support unit 20 in different installation angles, the steering knuckle 50 has different installation angles on the vehicle, and a caster to pinion angle will be different as well.

Second Embodiment

Referring to FIG. 8 to FIG. 14, the support device for spring includes a first support unit 20, a second support unit 30 and a connection unit 40. The first support unit 20 is fixed to a vehicle body, such as an axle tube 10 of a vehicle. The second support unit 30 is for supporting a damper spring. The connection unit 40 is capable of detachably fixing the second support unit 30 to the first support unit 20.

The second support unit 30 is provided with a first angle adjustment structure 31, and the connection unit 40 is provided with a second angle adjustment structure 41. One of the first angle adjustment structure 31 and the second angle adjustment structure 41 is provided with a plurality of protrusions, the other one of the first angle adjustment structure 31 and the second angle adjustment structure 41 is provided with a plurality of depressions. In some embodiments, the first angle adjustment structure 31 and the second angle adjustment structure 41 are both provided with a plurality of gear teeth. This means the protrusions are the gear teeth, and the depressions are formed between adjacent gear teeth. The protrusions or the depressions are disposed along an arc surface of the second support unit 30 or along an arc surface of the connection unit 40. The protrusions each is capable of engaging with different depressions, such that the second support unit 30 may be mounted to different circumferential portions of the first support unit 20, and may have different installation angles relative to the first support unit 20, which makes the damper spring on the second support unit 30 may have different relative angles to the vehicle body. Accordingly, an orientation angle of a spring support surface of the second support unit 30 can be adjusted as required, and further makes the vehicle can be conveniently fine-tuned without damage to the vehicle.

Figure 10:
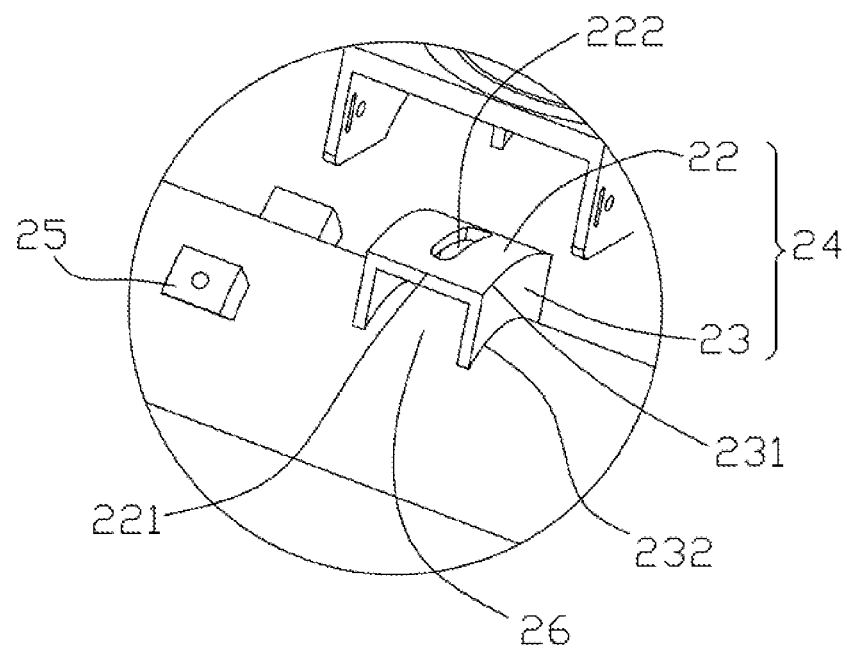
FIG. 10 is an enlarged view of circle X in FIG. 9.
Figure 11:
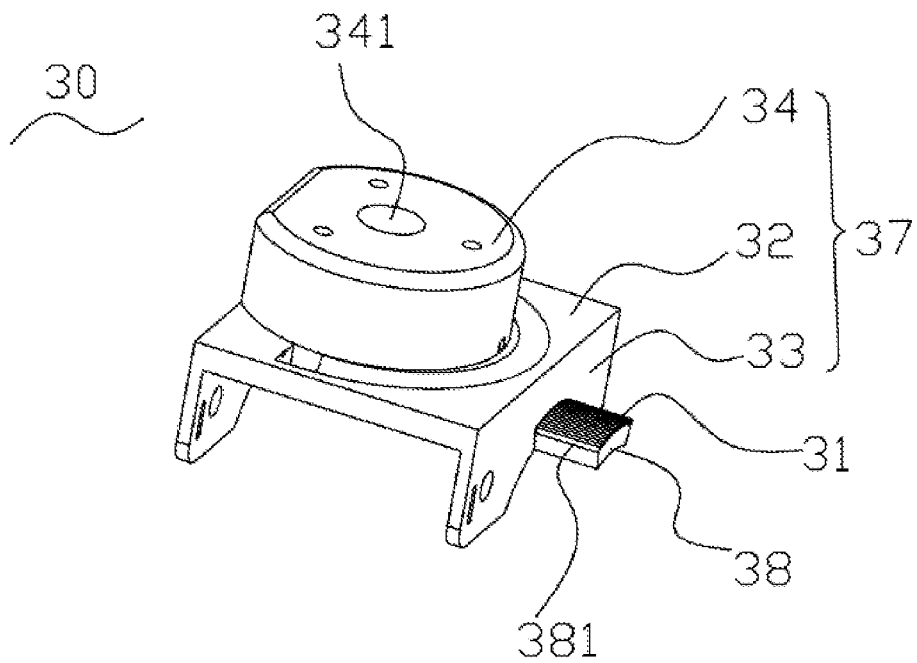
FIG. 11 is a schematic, isometric view of a second support unit in FIG. 8.
Figure 12:
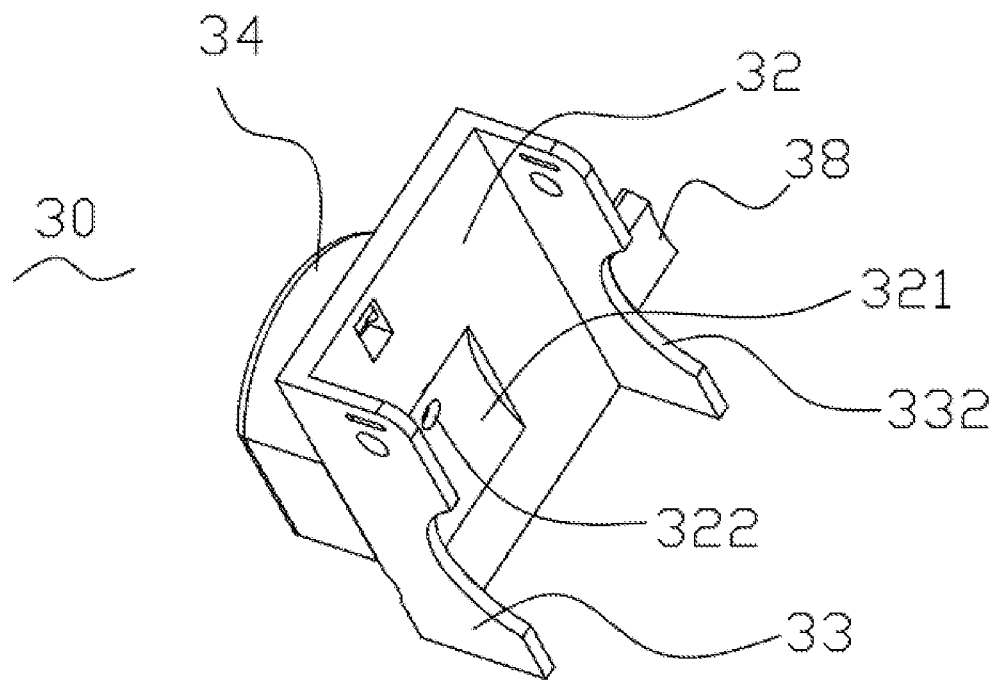
FIG. 12 is another schematic, isometric view of the second support unit in FIG. 8.
Figure 13:
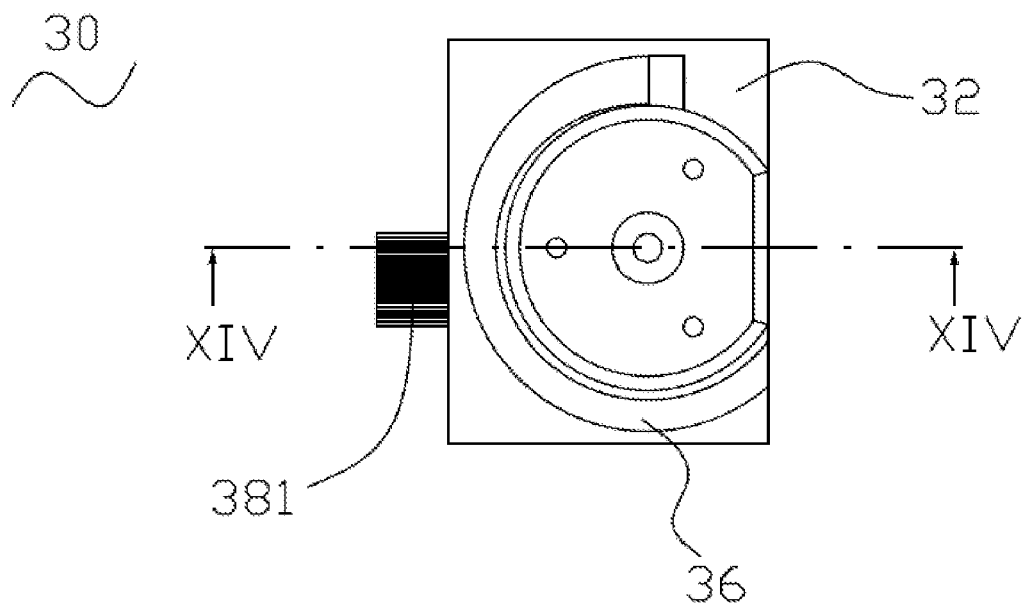
FIG. 13 is a schematic, top view of the second support unit in FIG. 8.
Figure 14:
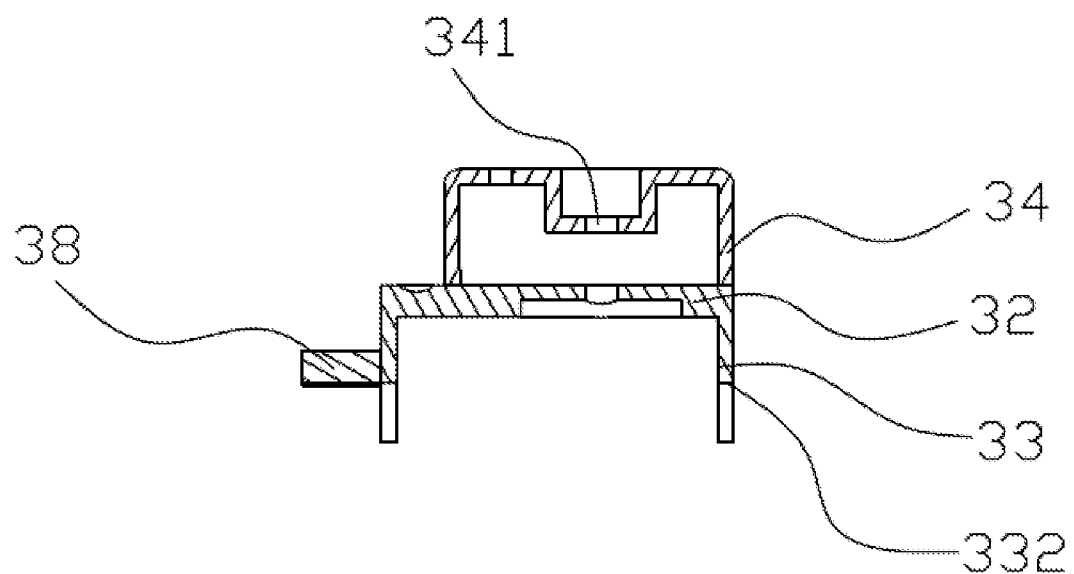
FIG. 14 is a schematic, cross-sectional view taken along line XIV-XIV of FIG. 13.

Referring to FIG. 10, the first support unit 20 includes a first support body 24 and a first connection base 25. The first support body 24 includes a first support substrate 22 and two first sidewalls 23 arranged at opposite left and right sides of the first support substrate 22. The first connection base 25 is disposed at one side of the first support body 24, for cooperating with the second support unit 30.

Viewed from the left or right side of the first support unit 20 (i.e., viewed from Y direction of the vehicle), the first support substrate 22 is arc-shaped and the first sidewalls 23 are substantially sector-shaped. The first support substrate 22 has an arc-shaped first contact surface 221 on an upper side which faces the second support unit 30. The first contact surface 221 is a convex surface with a central portion thereof protruding upwardly toward the second support unit 30. The first support substrate 22 includes an elongate hole 222 which extends along a circumferential direction of the first contact surface 221, for allowing at least a portion of the connection unit 40 passing through.

The first sidewall 23 has a first arc surface 231 and a second arc surface 232 which is parallel to the first arc surface 231. The first arc surface 231 is disposed at an outer portion of the first sidewall 23 and coplanar with the first contact surface 221. The second arc surface 232 is disposed at an inner portion of the first sidewall 23 and parallel to the first arc surface 231. In some embodiments, the second arc surface 232 is coplanar with an outer circumferential surface of the axle tube 10, resulting the first sidewall 23 of the first support unit 20 can perfectly match with the first arc surface of the axle tube 10, and the first support unit 20 can be firmly bonded or welded to the axle tube 10.

The first connection base 25 includes two mounting blocks which are bonded or welded to the axle tube 10. In some embodiment, the first connection base 25 may not be fixed to the axle tube 10, but be fixed to the first sidewall 23 instead. The mounting blocks are separately arranged along a circumferential direction of the axle tube 10, with the mounting blocks each has a first mounting hole 251 defined therein.

Referring to FIG. 11 to FIG. 14, the second support unit 30 includes a second support body 37 and a second connection base 38. The second support body 37 includes a second support substrate 32, two second sidewalls 33, and a spring support 34. The second sidewalls 33 extend downwardly from opposite left and right sides of the second support substrate 32. The spring support 34 is arranged on an upper side of the second support substrate 32 which is remote from the first support unit 20. The second connection base 38 is disposed at one side of the second sidewall 33.

The second support substrate 32 is substantially rectangular shaped, and has an arc-shaped second contact surface 321 on a lower side which faces the first support substrate 22. The second contact surface 321 is a convex surface with a central portion thereof protruding upwardly toward the spring support 34. When the second support unit 30 is placed on the first support unit 20, the second contact surface 321 contacts with the first contact surface 221, and is capable of rotating relative to the second contact surface 321.

The second sidewall 33 is substantially rectangular shaped, and has a third arc surface 332 on a lower portion thereof. The third arc surface 332 is parallel to the second contact surface 321 and coplanar with an outer circumferential surface of the axle tube 10, which makes the second sidewall 33 of the second support unit 30 can perfectly match with the outer circumferential surface of the axle tube 10, such that the second support unit 30 can rotate about the axle tube 10 and may have multiple installation angles relative to the axle tube 10. When the second support unit 30 is placed on the first support unit 20, the first support unit 20 is located between the two second sidewalls 33. A height of the second sidewall 33 is set in a manner that when the second support unit 30 is fixed to the first support unit 20, the third arc surface 332 of the second sidewall 33 abuts against the vehicle body, such as the axle tube 10 of the vehicle, in order to optimize the force exerted on the second support unit 30.

The second connection base 38 is integrally formed with or welded to one side of the second sidewall 33. The second connection base 38 is arc-shaped as viewed from the left or right side of the second support unit 30, and an arc-shaped third contact surface 381 is formed on an upper side of the second connection base 38. The first angle adjustment structure 31 is provided on the third contact surface 381 and the protrusions or the depressions are arranged along a circumferential direction of the third contact surface 381.

The spring support 34 is substantially column shaped, which is fixed to the second support substrate 32, for support the damper spring. The spring support 34 is provided with a first connection hole 341, and the second support substrate 32 is provided with a second connection hole 322. The first connection hole 341 aligns with the second connection hole 322, for allowing a portion of the connection unit 40 passing through. In this embodiment, the first connection hole 341 and the second connection hole 322 are round holes.

In some embodiments, the second support unit 30 includes a pad 35, which is arranged at an upper side of the second support substrate 32. A C-shaped recess for receiving the spring support 34 is defined in the pad 35. When the pad 35 is disposed on the second support substrate 32, an accommodation space 36 is formed between a side wall of the recess and a side wall of the spring support 34 to accommodate a bottom end of the damper spring. Alternatively, in some embodiments, there may be no pad 35, and the recess is defined in the second support substrate 32. The accommodation space 36 may be formed between at an upper portion of the s second support substrate 32.

Figure 9:
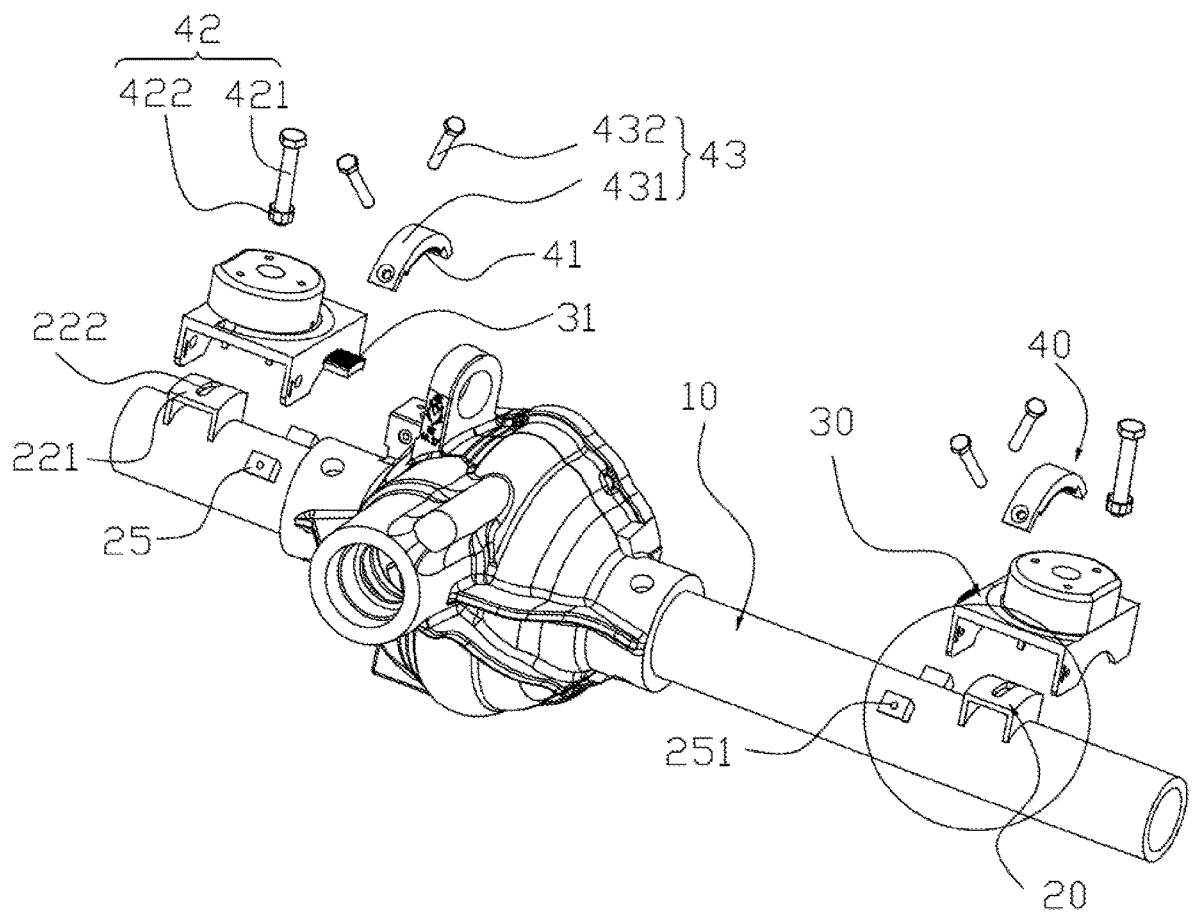
FIG. 9 is a schematic, exploded view of FIG. 8.

Referring to FIG. 9, the connection unit 40 may include a first connection apparatus 42 and a second connection apparatus 43. The first connection apparatus 42 is capable of connecting the second support substrate 32 with the first support substrate 22. A first portion of the second connection apparatus 43 is capable of covering the second connection base 38, and the second angle adjustment structure 41 is provided on the first portion of the second connection apparatus 43. A second portion of the second connection apparatus 43 is capable of cooperating with the first connection base 25 to sandwich the second connection base 38 between the first portion of the second connection apparatus 43 and the first connection base 25, such that the second support unit 30 may have different installation angles relative to the first support unit 20 since the second angle adjustment structure 41 may have different cooperation positions relative to the first angle adjustment structure 31.

The first connection apparatus 42 may include a first connection member 421 and a fixation member 422. The first connection member 421 may be a screw bolt, a rivet or a pin which may insert through the first support unit 20 and the second support unit 30. The fixation member 422 may be a screw nut which is capable of cooperating with the screw bolt, or a plug which is capable of being radially inserted into a hole of the rivet. In this embodiment, the first connection member 421 is a screw bolt and the fixation member 422 is a screw nut. During assembly, the first connection member 421 is inserted through the first connection hole 341, the second connection hole 322 and the elongate hole 222, and cooperates with the fixation member 422, so as to fix the second support unit 30 on the first support unit 20. When the first support unit 20 is bonded or welded on the vehicle body, an operation space 26 is formed between the first sidewall 23, the first support substrate 22 and the vehicle body, which is convenient for screwing the fixation member 422 onto the first connection member 421.

Figure 15:
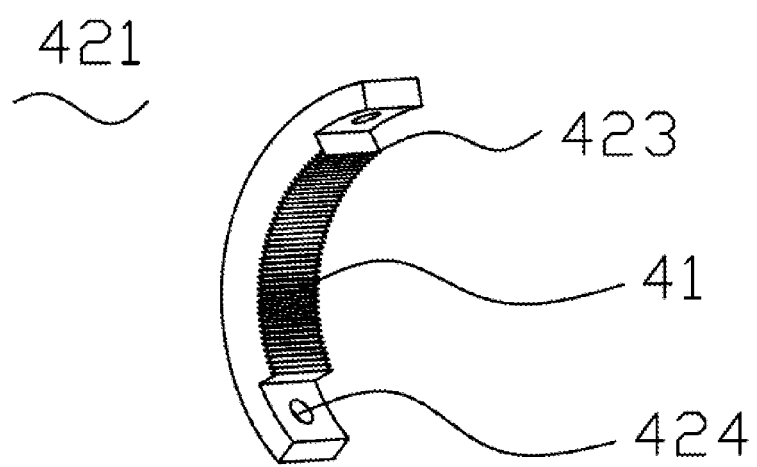
FIG. 15 is a schematic, isometric view of a cover plate in FIG. 8.

The second connection apparatus 43 includes a cover plate 431 and two second connection members 432. The second connection members 432 may be screws which can be screwed in the first connection base 25, to sandwich the second connection base 38 between the cover plate 431 and the first connection base 25. Alternatively, the second connection members 432 may be screw bolts, rivets or pins, which may cooperate with corresponding accessories to fix the cover plate 431 to the first connection base 25. Referring to FIG. 15, the cover plate 431 is arc-shaped as viewed from the left or right side of the second support unit 30. An arc-shaped fourth contact surface 423 is formed on a lower side of the cover plate 431, and two second mounting holes 424 are defined at two ends of the cover plate 431. The second angle adjustment structure 41 is provided on the fourth contact surface 423, and the protrusions or the depressions are arranged along a circumferential direction of the fourth contact surface 423. A longitudinal length of the second angle adjustment structure 41 is greater than a longitudinal length of the first angle adjustment structure 31, such that the cooperation positions of the second connection base 38 on the cover plate 431 can be regulated, which makes the second support unit 30 can be fixed at different installation angles relative to the first support unit 20. During assembly, the second connection members 432 extend through the second mounting holes 424 and are screwed in the first mounting holes 251 to fix the second support unit 30 to the first support unit 20.

In some embodiments, if the second support unit 30 is arranged on the first support unit 20, the protrusions each can extend into several different depressions. By the arrangement of the first angle adjustment structure 31 and the second angle adjustment structure 41 between the second support unit 30 and the connection unit 40, the second support unit 30 may be fixed to different circumferential positions of the first support unit 20, and have different installation angles relative to the first support unit 20. Since the contact surfaces are arc-shaped, when the protrusion engages in different depressions, a spring support surface of the second support unit 30 will face to different directions. Through the above arrangement, if the installation angle of the damper spring needs to be adjusted after the vehicle chassis is lifted, it can be adjusted by changing the relative circumferential position of the second support unit 30 to the first support unit 20, which makes the second support unit 30 may have different orientations, such that the installation angle of the damper spring can be adjusted. Therefore, on the basis of better support the damper spring, the orientation angle of the second support unit 30 can be adjusted as required, which facilitates to fine-tune the vehicle without damage.

Figure 16:
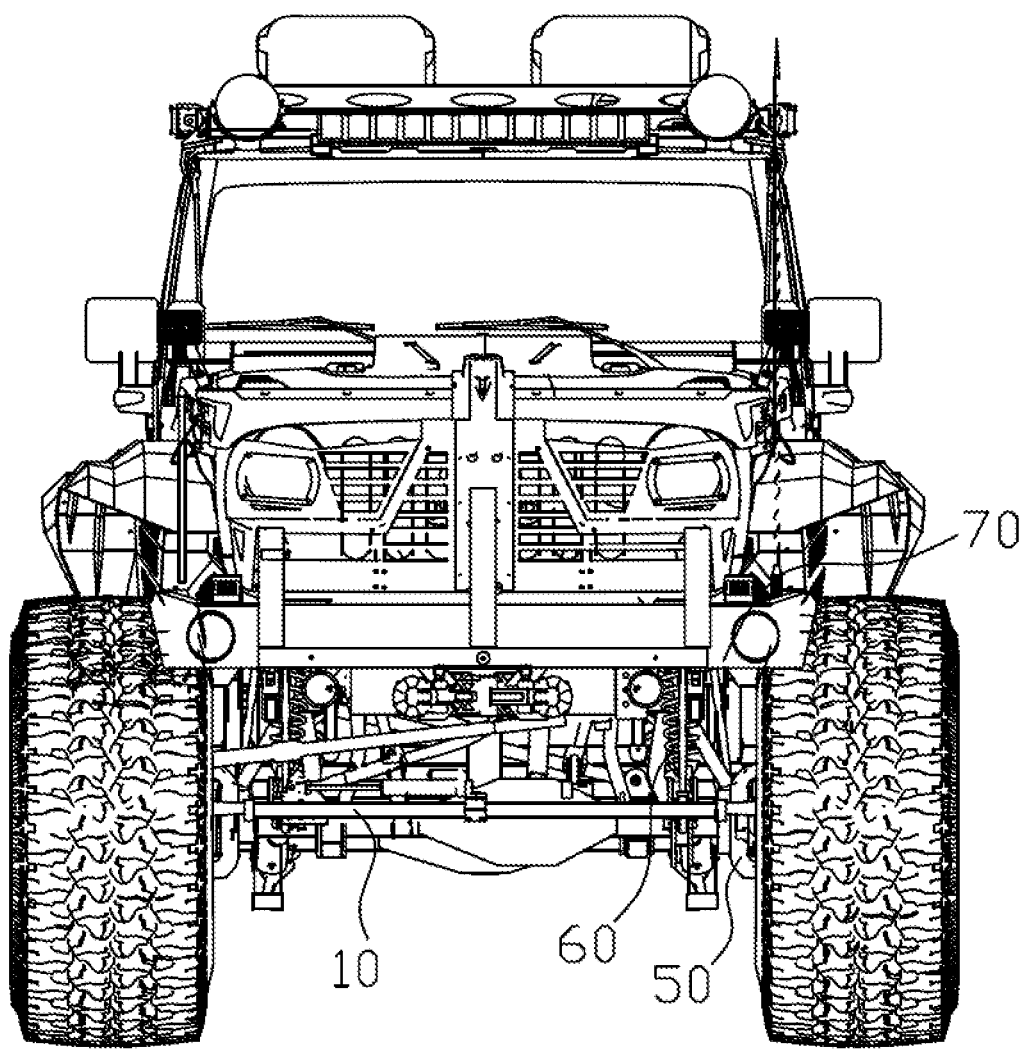
FIG. 16 is a schematic, front view showing an example of a vehicle having the support device for spring.

Referring to FIG. 16, some embodiments may include a vehicle. The vehicle includes the support device for spring, a damper spring 60 and a steering knuckle 50. The damper spring 60 is connected to a first portion of the vehicle body 70, such as the vehicle chassis. The support device for spring is used to connect a second portion of the vehicle body 70 (such as the axle tube 10) and the damper spring 60, and its structure is described as forgoing. The steering knuckle 50 is located at one side of the support device for spring, for connecting with a kingpin. In some embodiments, the steering knuckle 50 may be an inner-C-forgoing. The first support unit 20 of the support device for spring is fixed on the axle tube 10, and the connection unit 40 is capable of detachably fixing the second support unit 30 on the first support unit 20 with different installation angles. If the second support unit 30 is fixed on the first support unit 20 in different installation angles, the steering knuckle 50 has different installation angles on the vehicle, and a caster to pinion angle will be different as well.

The above are merely specific embodiments of the present document, but are not intended to limit the protection scope of the present document. Any variations or replacements which will become apparent to those skilled in the art to which the present document pertains, shall also fall within the protection scope of the present document. Therefore, the protection scope of the present document shall be subject to the appended claims

What is claimed is:

1. A support device for spring, comprising:
a first support unit configured for being fixed to an axle tube of a vehicle body;
a second support unit configured for supporting a damper spring and being rotatable around the axle tube; and
a connection unit configured for detachably fixing the second support unit to different positions of the first support unit, in response to a position change of the second support unit on the first support unit, an orientation of a spring support surface of the second support unit changes.

2. The support device for spring according to claim 1, wherein one of adjacent two units of the first support unit, the second support unit and the connection unit is provided with a first angle adjustment structure, the other one of the adjacent two units of the first support unit, the second support unit and the connection unit is provided with a second angle adjustment structure, the first angle adjustment structure has different circumferential positions relative to the second angle adjustment structure.

3. The support device for spring according to claim 2, wherein one of the first angle adjustment structure and the second angle adjustment structure is provided with a plurality of protrusions, the other one of the first angle adjustment structure and the second angle adjustment structure is provided with a plurality of depressions, the protrusions each is capable of engaging with several different depressions, making the second angle adjustment structure have different installation angles relative to the first angle adjustment structure.

4. The support device for spring according to claim 2, wherein the first support unit has an arc-shaped first contact surface, the second support unit has an arc-shaped second contact surface which is capable of contacting with different positions of the first contact surface, the first angle adjustment structure is provided on the first contact surface, and the second angle adjustment structure is provided on the second contact surface.

5. The support device for spring according to claim 4, wherein the first support unit has an elongate hole extending along a circumferential direction of the first contact surface, the second support unit has a connection hole defined therethrough, the connection unit comprises a first connection member capable of extending through the connection hole and the elongate hole, for fixing the second support unit to the first support unit.

6. The support device for spring according to claim 5, wherein the first support unit comprises a first support substrate and two first sidewalls disposed at opposite sides of the first support substrate, the second support unit comprises a second support substrate and two second sidewalls disposed at opposite side of the second support substrate, the second support unit is capable of covering the first support unit, the first contact surface and the second contact surface are provided between the first support substrate and the second support substrate.

7. The support device for spring according to claim 2, wherein the second support unit has an arc-shaped third contact surface, the connection unit has an arc-shaped fourth contact surface which is capable of contacting with the third contact surface, the first angle adjustment structure is provided on the third contact surface, and the second angle adjustment structure is provided on the fourth contact surface.

8. The support device for spring according to claim 7, wherein the first support unit comprises a first support body and a first connection base, both of which are fixed to the vehicle body, the second support unit comprises a second support body which is capable of covering the first support body, and a second connection base which is connected with the second support body, the connection unit comprises a cover plate which is capable of covering the second connection base, and a second connection member which is capable of cooperating with the first connection base to sandwich the second connection base between the first connection base and the cover plate, the third contact surface is formed on the second connection base, the fourth contact surface is formed on the cover plate.

9. The support device for spring according to claim 8, wherein the first support body has a first contact surface and an elongate hole extending through the first support body, the second support body has a second contact surface capable of contacting with the first contact surface and a connection hole extending through the second support body, the connection unit comprises a first connection member which is capable of extending through the connection hole and the elongate hole, to fix the second support body to the first support body.

10. A support device for spring, comprising:
a first support unit configured for being fixed to a vehicle body;

a second support unit configured for supporting a damper spring; and a connection unit comprising a first connection apparatus which is capable of cooperating with the first support unit to sandwich the second support unit therebetween;

one of adjacent units of the first support unit, the second support unit and the connection unit comprising a first angle adjustment structure, the other one of adjacent units of the first support unit, the second support unit and the connection unit comprising a second angle adjustment structure, the first angle adjustment structure being formed on and extending along a longitudinal direction of a first contact surface, the second angle adjustment structure being formed on and extending along a longitudinal direction of a second contact surface, the second contact surface being capable of contacting with the first contact surface along an extension direction of the first angle adjustment structure, the second angle adjustment structure being capable of cooperating with different positions of the first angle adjustment structure, such that the second support unit is capable of having different installation angles relative to the first support unit.

11. The support device for spring according to claim 10, wherein the first support unit comprises a first support body, the first contact surface and an elongate hole, the second support unit comprises a second support body, the second contact surface and a connection hole, the first contact surface and the second contact surface are formed between the first support body and the second support body, and the first contact surface and the second contact surface are configured in arc shape, the elongate hole extends along a circumferential direction of the first contact surface, the connection hole extends through the second support body, the first connection apparatus comprises a first connection member capable of extending through the connection hole and the elongate hole, for fixing the second support unit to the first support unit.

12. The support device for spring according to claim 11, wherein the first support body comprises a first support substrate and two first sidewalls disposed at opposite sides of the first support substrate, the second support body comprises a second support substrate and two second sidewalls disposed at opposite side of the second support substrate, the second support unit is capable of covering the first support unit, the first contact surface and the second contact surface are provided between the first support substrate and the second support substrate.

13. The support device for spring according to claim 11, wherein the first angle adjustment structure and the second angle adjustment structure are provided on the first contact surface and the second contact surface respectively, one of the first angle adjustment structure and the second angle adjustment structure is provided with a plurality of protrusions, the other one of the first angle adjustment structure and the second angle adjustment structure is provided with a plurality of depressions, the protrusions each is capable of engaging with several different depressions.

14. The support device for spring according to claim 11, wherein the second support unit comprises an arc-shaped third contact surface, the connection unit comprises a cover plate capable of covering the third contact surface, and the cover plate comprises an arc-shaped fourth contact surface, the first angle adjustment structure and the second angle adjustment are provided on the third contact surface and the fourth contact surface respectively, with a longitudinal length of the second angle adjustment structure being greater than a longitudinal length of the first angle adjustment structure, one of the first angle adjustment structure and the second angle adjustment structure is provided with a plurality of protrusions, the other one of the first angle adjustment structure and the second angle adjustment structure is provided with a plurality of depressions, the protrusions each is capable of engaging with several different depressions.

15. The support device for spring according to claim 14, wherein the first support unit comprises a first connection base being fixed to the vehicle body, the second support unit comprises a second connection base being connected with the second support body, the connection unit comprises a second connection member capable of cooperating with the first connection base to sandwich the second connection base between the first connection base and the cover plate.

16. A vehicle, comprising:
a damper spring; and
a support device for supporting the damper spring, comprising:
a first support unit configured for being fixed to a vehicle body;
a second support unit configured for supporting a damper spring; and
a connection unit comprising a first connection apparatus which is capable of cooperating with the first support unit to sandwich the second support unit therebetween;
one of adjacent units of the first support unit, the second support unit and the connection unit comprising a first angle adjustment structure, the other one of adjacent units of the first support unit, the second support unit and the connection unit comprising a second angle adjustment structure, one of the first angle adjustment structure and the second angle adjustment structure being provided with a plurality of protrusions, the other one of the first angle adjustment structure and the second angle adjustment structure being provided with a plurality of depressions, the protrusions each being capable of engaging with several different depressions.

17. The vehicle according to claim 16, wherein the second support unit comprises a first contact surface, the first connection apparatus comprises a cover plate and a first connection member, the cover plate comprises a second contact surface, the first angle adjustment structure and the second angle adjustment structure are provided on the first contact surface and the second contact surface respectively, the first connection member is capable of cooperating with the first support unit to sandwich the second connection base between the first connection base and the cover plate.

18. The vehicle according to claim 17, wherein the first support unit comprises a first support body and a first connection base, both of which are fixed to the vehicle body, the second support unit comprises a second support body which is capable of having different circumferential cooperation positions on the first support body, and a second connection base which is connected with the second support body, the first connection member is capable of cooperating with the first connection base to sandwich the second connection base between the first connection base and the cover plate.

19. The vehicle according to claim 18, wherein the first support body comprises a first support substrate and two first sidewalls disposed at opposite sides of the first support substrate, the second support body comprises a second support substrate and two second sidewalls disposed at opposite sides of the second support substrate, an arc-shaped third contact surface and an arc-shaped fourth contact surface are respectively formed on the first support substrate and the second support substrate, the connection unit comprising a second connection apparatus which comprises a second connection member capable of extending through the second support body and the first support body to fix the second support body on the first support body.

20. The vehicle according to claim 16, wherein the first support unit comprises a first support body, a first contact surface formed on the first support body, and an elongate hole extending through the first support body; the second support unit comprises a second support body capable of covering the first support body, a second contact surface capable of having different relative angles to the first contact surface, and a connection hole extending though the second support body, the first connection apparatus comprises a first connection member which is capable of extending through the connection hole and the elongate hole, to fix the second support body to the first support body.

\* \* \* \* \*